United States Patent
Wang (10) Patent No.: US 7,839,326 B2
(45) Date of Patent: Nov. 23, 2010

(54) PORTABLE TERMINAL

(75) Inventor: Wan Wang, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 256 days.

(21) Appl. No.: 12/144,205

(22) Filed: Jun. 23, 2008

(65) Prior Publication Data

US 2009/0002228 A1 Jan. 1, 2009

(30) Foreign Application Priority Data

Jun. 28, 2007 (JP) ............................ P2007-170760

(51) Int. Cl.
G01S 19/40 (2010.01)
(52) U.S. Cl. ............................................... 342/357.23
(58) Field of Classification Search ............ 342/357.12, 342/357.02
See application file for complete search history.

(56) References Cited

U.S. PATENT DOCUMENTS 6,295,022 B1 * 9/2001 Dutka ................... 342/357.06
2008/0246661 A1 * 10/2008 Nagahara et al. ....... 342/357.15

FOREIGN PATENT DOCUMENTS

JP 2002-243832 A 8/2002
WO WO 98/02762 A2 * 1/1998

* cited by examiner

Primary Examiner—Thomas H Tarcza
Assistant Examiner—Fred H Mull
(74) Attorney, Agent, or Firm—Holtz, Holtz, Goodman & Chick, PC (57) ABSTRACT

According to one embodiment, a portable terminal includes: a display unit that displays a present location of the portable terminal; a GPS receiver that calculates theoretical precision data determined theoretically by geometric arrangement of plural GPS satellites on the basis of location information of the GPS satellites, and performs a positioning process by which positioning data for indicating the present location of the portable terminal is calculated using arrival time of the radio wave; and a control unit that repeats the positioning process performed by the GPS receiver plural times to calculate a cumulative average of the positioning data, and calculates a difference between the cumulative average of the theoretical precision data and the cumulative average of the positioning data to display a cumulative average of the positioning data, when the difference equal to or less than a predetermined value successively continues predetermined number of times, as the present location of the portable terminal.

8 Claims, 6 Drawing Sheets

(A): POSITIONING DATA [m]

(B): CHANGE OF CUMULATIVE AVERAGES OF POSITIONING DATA

PORTABLE TERMINAL

CROSS-REFERENCE TO RELATED APPLICATIONS

This application is based upon and claims the benefit of priority from Japanese Patent Application No. 2007-170760, filed Jun. 28, 2007, the entire contents of which are incorporated herein by reference.

BACKGROUND

1. Field

One embodiment of the invention relates to a portable terminal capable of performing location measurement using a GPS function.

2. Description of the Related Art

There is a wristwatch type positioning device which measures a location using a GPS (for example, see JP-A-2002-243832 (Paragraph Number 0027 to 0042 and FIGS. 4 to 6)). The positioning device is operated in a precision priority measurement mode in which precision is higher than that of a one-time measurement mode. A GPS module 8 of the positioning device measures a DOP (Dilution of Precision) value indicating location measurement for calculating a present location and precision of the location measurement on satellite data.

In a second embodiment, the DOP value desired beforehand by a user and continuous time of successive positioning are input in the precision priority measurement mode. In addition, the positioning device searches satellites within the range of the continuous time and calculates the location measurement and the DOP value on the basis of the satellite data to display the DOP value on a precision indicator 100. In addition, the positioning device displays longitude and latitude of the location measurement measured on a display unit 12 when the calculated DOP value is equal to or less than the desired DOP value, and turns off the GPS module to terminate the positioning process. In addition, when the continuous time of the successive positioning ends, the GPS module is turned off to terminate the positioning process. In this way, the positioning process with the precision desired by the user can be performed and unnecessary power consumption can be suppressed.

The positioning device disclosed in JP-A-2002-243832 calculates the DOP indicating the precision of the location measurement. The DOP is theoretical precision which is determined on the basis of the number of satellites received by the positioning device or the geometric arrangement of the satellites. The present location of the positioning device determined by the positioning device is determined by the theoretical precision of the DOP and factors unrelated to the DOP including indefinite imbalance factors and the like caused due to an error of reflection and the like on buildings where the positioning device is located.

Accordingly, in the positioning device disclosed in JP-A-2002-243832, there is a situation that the calculated DOP value becomes a value equal to or less than a desired DOP value, that is, the location measurement at the moment when the theoretical precision is good does not necessarily have high precision and may have much error.

SUMMARY

According to one aspect of the invention, there is provided a portable terminal including: a display unit that displays a present location of the portable terminal; a GPS receiver that calculates theoretical precision data determined theoretically by geometric arrangement of plural GPS satellites on the basis of location information of the GPS satellites contained in the radio wave emitted from the GPS satellites, and performs a positioning process by which positioning data for indicating the present location of the portable terminal is calculated using arrival time of the radio wave; and a control unit that repeats the positioning process performed by the GPS receiver plural times to calculate a cumulative average of the positioning data, and calculates a difference between the cumulative average of the theoretical precision data and the cumulative average of the positioning data to display a cumulative average of the positioning data, when the difference equal to or less than a predetermined value successively continues predetermined number of times, as the present location of the portable terminal on the display unit.

According to another aspect of the invention, there is provided a portable terminal including: a display unit that displays a present location of the portable terminal and location measurement precision; an input unit; a GPS receiver that calculates theoretical precision data determined by geometric arrangement of plural GPS satellites on the basis of location information of the GPS satellites contained in radio wave emitted from the GPS satellites, and performs a positioning process by which positioning data for indicating the present location of the portable terminal is calculated using arrival time of the radio wave; and a control unit that repeats the positioning process performed by the GPS reception unit plural times to calculate a cumulative average of the positioning data, calculates a difference between the cumulative average of the theoretical precision data and the cumulative average of the positioning data to display the difference as the location measurement precision on the display unit, and displays a cumulative average of the positioning data, when a predetermined instruction is input to the input unit, as the present location of the portable terminal on the display unit.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Hereinafter, an embodiment of the invention will be described with reference to the drawings.

Figure 1:
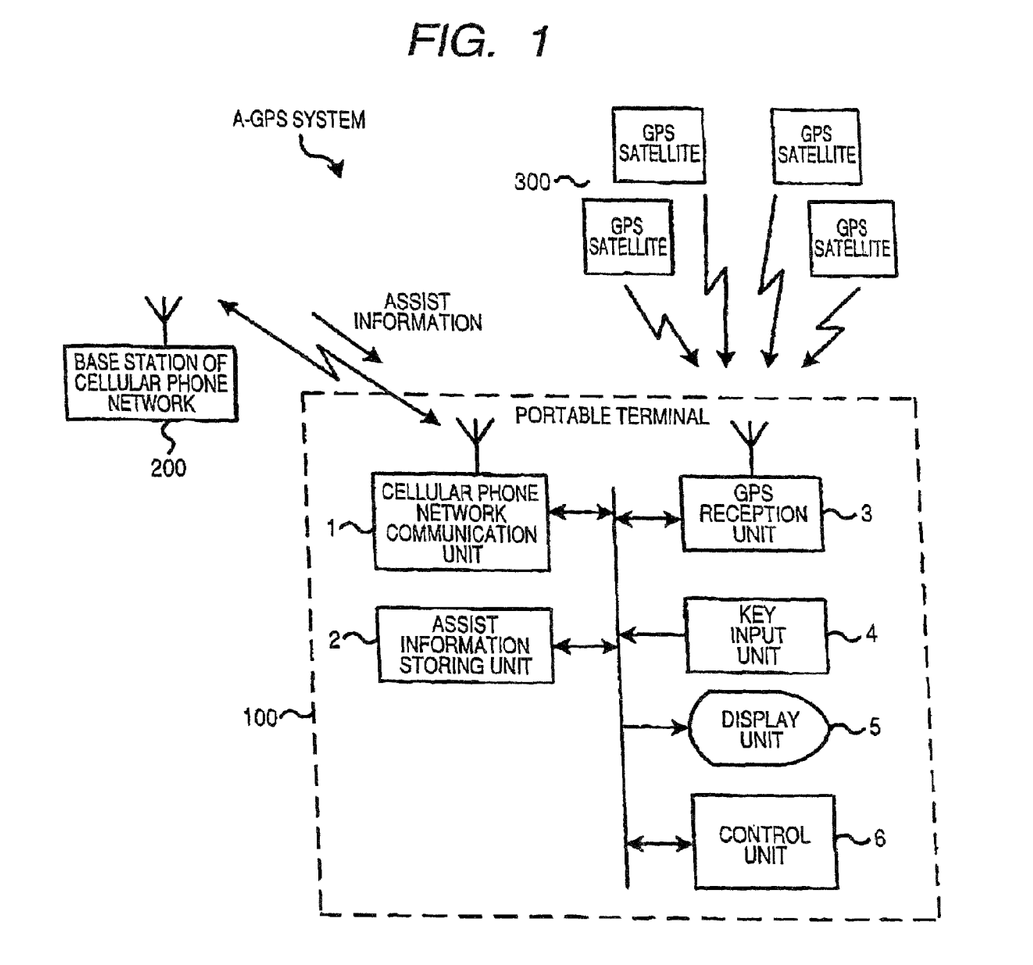
FIG. 1 is an exemplary block diagram illustrating an A-GPS (Assisted GPS) system and a portable terminal according to the embodiment.

FIG. 1 is a block diagram illustrating an A-GPS (Assisted GPS) system and a portable terminal according to the embodiment of the invention.

The A-GPS system includes a cellular phone 100, a base station 200 of a cellular phone network, and GPS satellites 300. As for the GPS satellites 300, 24 satellites orbit around the earth, as well known. The satellites are not stationary satellites but moves from moment to moment. The cellular phone 100 collects assist information from the base station 200 to search the GPS satellites.

When the cellular phone 100 performs a GPS positioning process, a server (not shown) of the cellular phone network transmits IDs and the like of four GPS satellites most appropriate for the cellular phone 100 to perform GPS reception, which is the assist information, to the cellular phone 100 in advance on the basis of a cell of the cellular phone network to which the cellular phone 100 belongs or the location of the base station.

The cellular phone 100 searches the four GPS satellites and receives spatial location information or various codes for the GPS satellites from the GPS satellites through a radio wave. In addition, distances between the GPS satellites and the cellular phone are calculated using arrival time of the codes of the radio wave propagated from the GPS satellites. On the basis of the distances, the present location of the cellular phone 100 is calculated as positioning data of an X-coordinate, a Y-coordinate, and a Z-coordinate for the earth surface in accordance with a triangulation principle. One of the four GPS satellites is used to correct a clock for measuring the arrival time.

An error occurs in the positioning data calculated by the cellular phone 100. One of factors for the error is a theoretical precision determined theoretically by the geometrical arrangement of each GPS satellite and the cellular phone. The cellular phone 100 calculates the theoretical precision data on the basis of the spatial location information and the like of the GPS satellites.

Another factor for the error of the positioning data is radio wave delay which has an effect on the arrival time of the radio wave. In addition, electron density of the ionosphere, a vapor amount of atmosphere, a distance of the atmospheric layer, and the like have an effect on the arrival time of the radio wave. Multipath or the like caused by a radio wave reflected on a building or the earth surface has an effect on the arrival time. It is difficult to calculate an error caused by these factors other than the geometric arrangement. Moreover, when the view of the sky is obscured by a high-rise building or a mountain, the cellular phone cannot search the most appropriate GPS satellite, thereby increasing the error.

Accordingly, even though the theoretical precision data is good, the precision of the positioning data is not necessarily good.

The cellular phone 100 includes a cellular phone network communication unit 1, an assist information storing unit 2, a GPS reception unit 3, a key input unit 4, a display unit 5, and a control unit 6 therein. The cellular phone network communication unit 1 transmits and receives wireless signals with a cellular phone network; performs processes such as amplification, modulation, and demodulation; and collects the assist information for GPS measurement from a server (not shown) of the cellular phone network via the base station 200. The assist information storing unit 2 stores the assist information.

The GPS reception unit 3 receives a radio wave from the GPS satellites to calculate the theoretical precision data and the positioning data (the X-coordinate, the Y-coordinate, and the Z-coordinate) indicating the present location of the cellular phone 100, and transmit them to the control unit 6.

The key input unit 4 is an input unit for various operational keys. The display unit 5 displays various types of display output and includes an LCD and the like.

The control unit 6 includes a CPU, a ROM, a RAM, and a controller, controls other constituent elements, and performs major functions of the cellular phone 100. In particular, the control unit 6 performs a process for the GPS positioning according to the invention.

Figure 2:
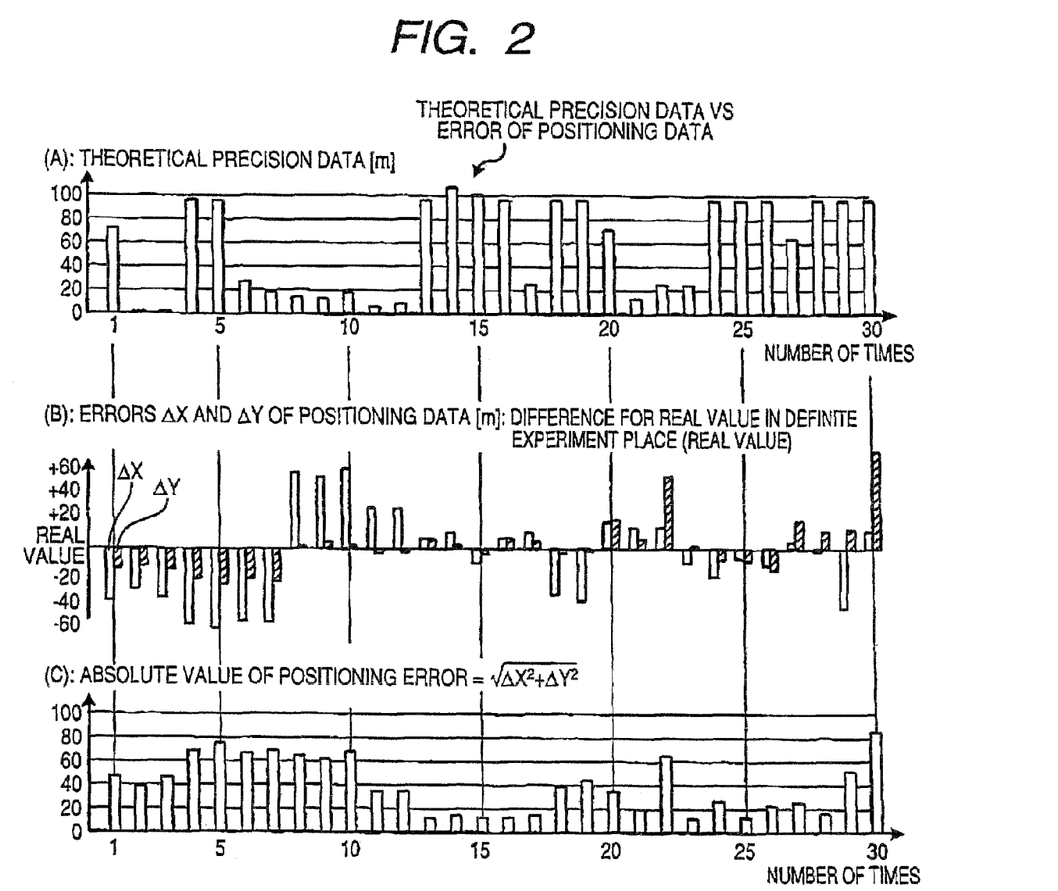
FIG. 2 is a graph showing theoretical precision data and an error of the positioning data as time series in an experiment of the location measurement for the portable terminal according to the embodiment.

FIG. 2 is a graph showing the theoretical precision data and an error of the positioning data as time series in an experiment of the location measurement for the portable terminal according to the embodiment of the invention. The positioning process is successively performed 30 times at a predetermined period in the same location without moving to another location, and each of the theoretical precision data and the positioning data (where the Z-coordinate is omitted) is shown. The 30 times data calculated by the GPS reception unit 3 is the theoretical precision data and the positioning data calculated on the basis of the radio wave received from the GPS satellites by using the designated GPS satellites assisted from the cellular phone network.

The data is experimental data, and the X-coordinate and the Y-coordinate of the positioning location are known as a real value beforehand. In addition, a difference between the real value and the positioning data, that is, the error ($\Delta X$ and $\Delta Y$) can be calculated in the experiment.

In a normal GPS use of the portable terminal, the real value is not clear. Moreover, only the theoretical precision data and the positioning data (the X-coordinate and the Y-coordinate) are just known.

FIG. 2(A) shows the theoretical precision data. The theoretical precision data refers to theoretical precision which is determined theoretically by the geometric arrangement of the GPS satellites and the portable terminal. Moreover, the original size of the theoretical precision data may not be changed even though the measurement is carried out 30 times for a short time. That is because spatial movement of the GPS satellites is not so large as long as the theoretical precision data is calculated using the data received from the same GPS satellites.

However, the experimental data is not uniform. In addition, it is considered that the non-uniformity of the experimental data occurs due to multipath caused by a vehicle in a measurement location, a difference of supplementary satellites caused by forecast variation, or the like.

In FIG. 2(B), the errors $\Delta X$ and $\Delta Y$ for the real value known beforehand in the experiment have been calculated on the basis of the positioning data (the X-coordinate and the Y-coordinate) calculated by the date received from the GPS satellites.

In FIG. 2(C), absolute values of the errors obtained by vector addition of the errors $\Delta X$ and $\Delta Y$ is the square root of (the square of $\Delta X$+the square of $\Delta Y$). In the normal use, the real value and the errors are not clear and only the positioning data (the X coordinate and the Y coordinate) are known.

Comparing the theoretical precision data shown in FIG. 2(A) and the absolute values of the positioning errors shown in FIG. 2(C) during the 30 times measurement, the precision of the positioning data is not necessarily good even though the precision of the theoretical precision data is good. Moreover, even though the precision of the theoretical precision data is bad, the precision of the positioning data is not necessarily bad. That is, the correlation therebetween is low. That is because electron density of the ionosphere, a vapor amount of atmosphere, a distance of the atmospheric layer, and the like have an effect on the error of the positioning data as well as the theoretical precision determined by the geometric arrangement of the GPS satellites and the portable terminal. In particular, it is considered that the multipath or the like caused by a radio wave reflected on a building, the earth surface, a vehicle, or the like occurs due to factors which vary at random from moment to moment.

Accordingly, it is problematic that the position data is correct when the theoretical precision data is good.

Figure 3:
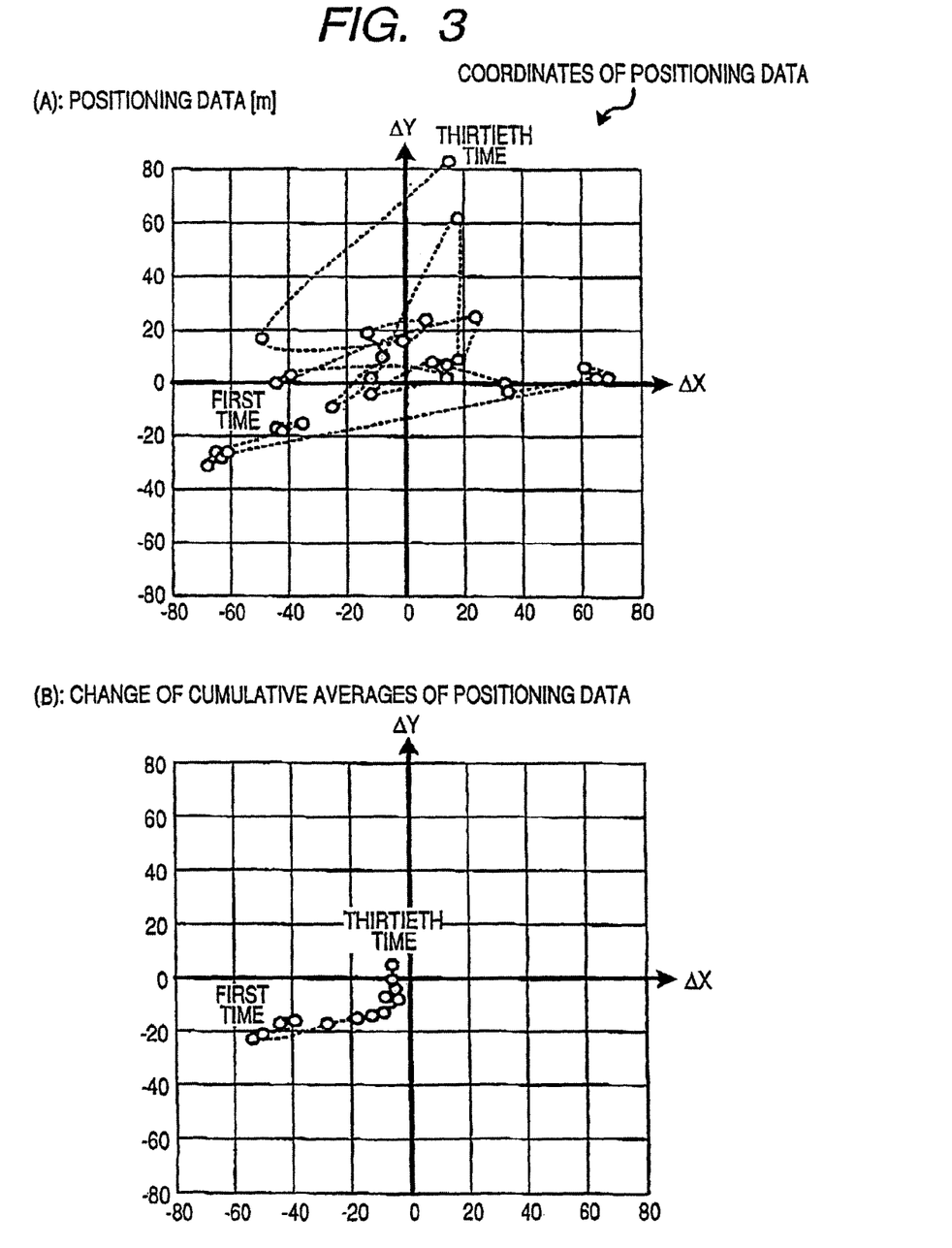
FIG. 3 is a diagram illustrating the positioning data plotted on X-Y coordinates in the experiment of location measurement for the portable terminal according to the embodiment.

FIG. 3 is a diagram illustrating the positioning data plotted on X-Y coordinates in the experiment of location measurement for the portable terminal according to the embodiment of the invention.

In FIG. 3(A), the error $\Delta X$ and the error $\Delta Y$ of the positioning data are plotted from the first time to the thirtieth time. The center of the coordinates is the real value known in the experiment. In the coordinates, the errors occur at random vertically and horizontally for the real value. The reason is considered because the multipath or the like caused by a radio wave reflected on a building, the earth surface, a vehicle, or the like, which is a factor of the errors for the positioning data, occurs at random in a shape of normal distribution for the positioning data.

Accordingly, when an average value of the positioning data is evaluated, the positioning data gradually approximates to the real value as the cumulative number of the times increases.

In FIG. 3(B), the average values of the positioning data are plotted whenever the cumulative number of the times increases, and the cumulative average of the error $\Delta X$ and the cumulative average of the error $\Delta Y$ are shown.

The cumulative average (n-th average) of the error $\Delta X$ is equal to $\Sigma(1 \text{ to } n)$ error $\Delta X/n$, and the cumulative average (n-th average) of the error $\Delta Y$ is equal to $\Sigma(1 \text{ to } n)$ error $\Delta Y/n$, where n is 1 to 30. In this way, the positioning data approximates to the real value at the thirtieth time.

Figure 4:
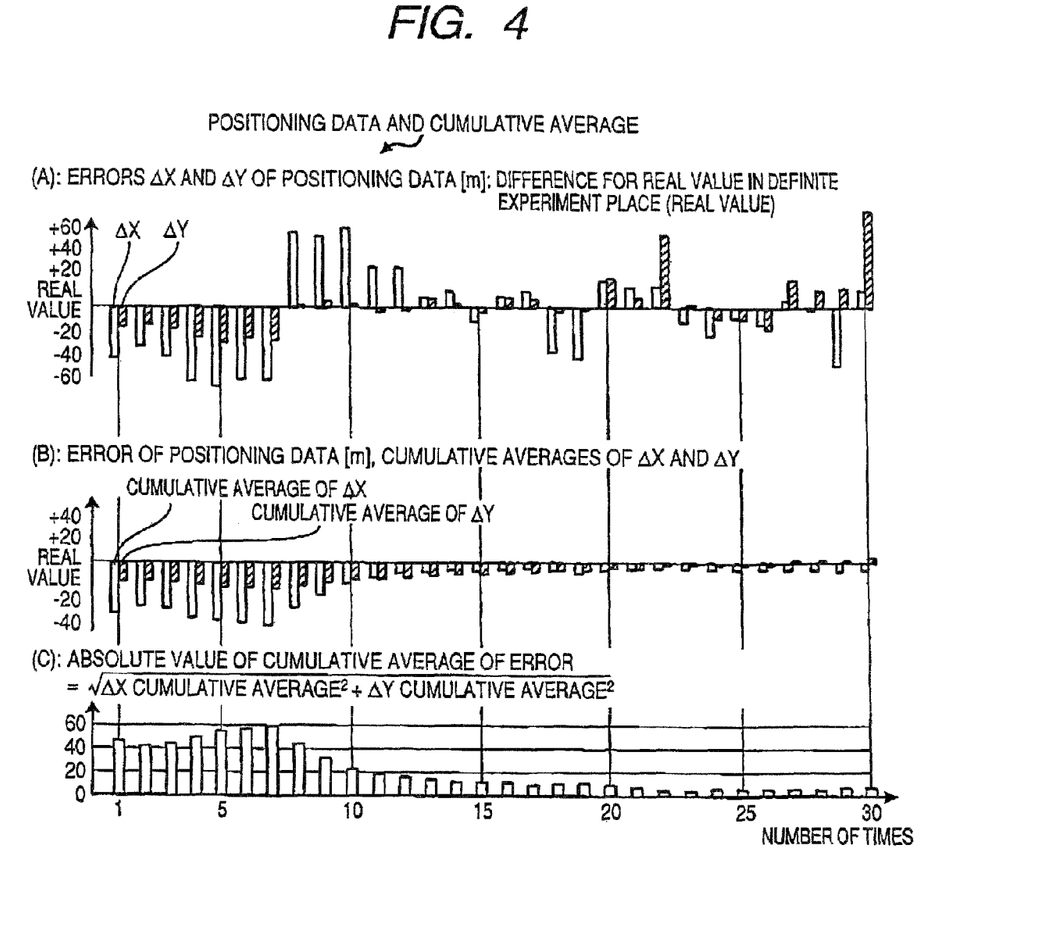
FIG. 4 is a graph showing the cumulative averages for the positioning data as time series in the experiment of the location measurement for the portable terminal according to the embodiment.

FIG. 4 is a graph showing the cumulative averages for the positioning data as time series in the experiment of the location measurement for the portable terminal according to the embodiment of the invention. The same as those shown in FIG. 3(B) are shown as time series.

Since the real value is not clear in the normal use of the portable terminal, the errors $\Delta x$ and $\Delta Y$ of the positioning data cannot be evaluated. However, the cumulative averages of the positioning data (the X-coordinate and the Y-coordinate) can be calculated. Accordingly, as the cumulative number of times increases, the cumulative average of the X-coordinate and the cumulative average of the Y-coordinate approximate the real value.

FIG. 4(A) shows the errors $\Delta X$ and $\Delta Y$ of the positioning data for the real value obtained in the experiment of the positioning data (the X-coordinate and the Y-coordinate) in every measurement are shown, and is the same as FIG. 2(B). The positioning data (the X-coordinate and the Y-coordinate) is obtained in the normal use, but the errors $\Delta X$ and $\Delta Y$ are not clear.

FIG. 4(B) shows every cumulative average of the error $\Delta X$ and every cumulative average of the error $\Delta Y$ obtained by dividing the cumulative value of the error by the cumulative number of times for the errors $\Delta X$ and $\Delta Y$ of the positioning data in FIG. 4(A). The same as those shown in FIG. 3(B) are shown as time series.

FIG. 4(C) shows absolute values of vectors for the cumulative average of the error $\Delta X$ and the cumulative average of the error $\Delta Y$.

As known from the absolute values, the cumulative average values approximate to the real value whenever the cumulative number of the times increases. After about the tenth cumulative average, the error becomes about 20 m or less, which is the satisfying range for the portable terminal.

Since the real value is not clear in the normal use, the cumulative average of the error $\Delta X$ and the cumulative average of the error $\Delta Y$ cannot be calculated. However, when the cumulative average of the positioning data X and the cumulative average of the positioning data Y are evaluated, the positioning data (the X-coordinate and the Y-coordinate) approximates to the real value X and the real value Y likewise as the cumulative number of times increases.

However, from the cumulative average of the positioning data X and the cumulative average of the positioning data Y, it cannot be recognized whether the positioning data approximates to the real value at the cumulative number of times. If the cumulative average is evaluated at a sufficient cumulative number of times, it can be recognized that the cumulative average of the positioning data X and the cumulative average of the positioning data Y approximate to a real value X and a real value, respectively. At this time, however, since it takes much time, it is not desirable in that the power of the portable terminal is consumed and a user waits for a long time.

Next, there will be described a method of determining whether the cumulative average of the positioning data X and the cumulative average of the positioning data Y approximate to the real value X and the real value Y, respectively.

Figure 5:
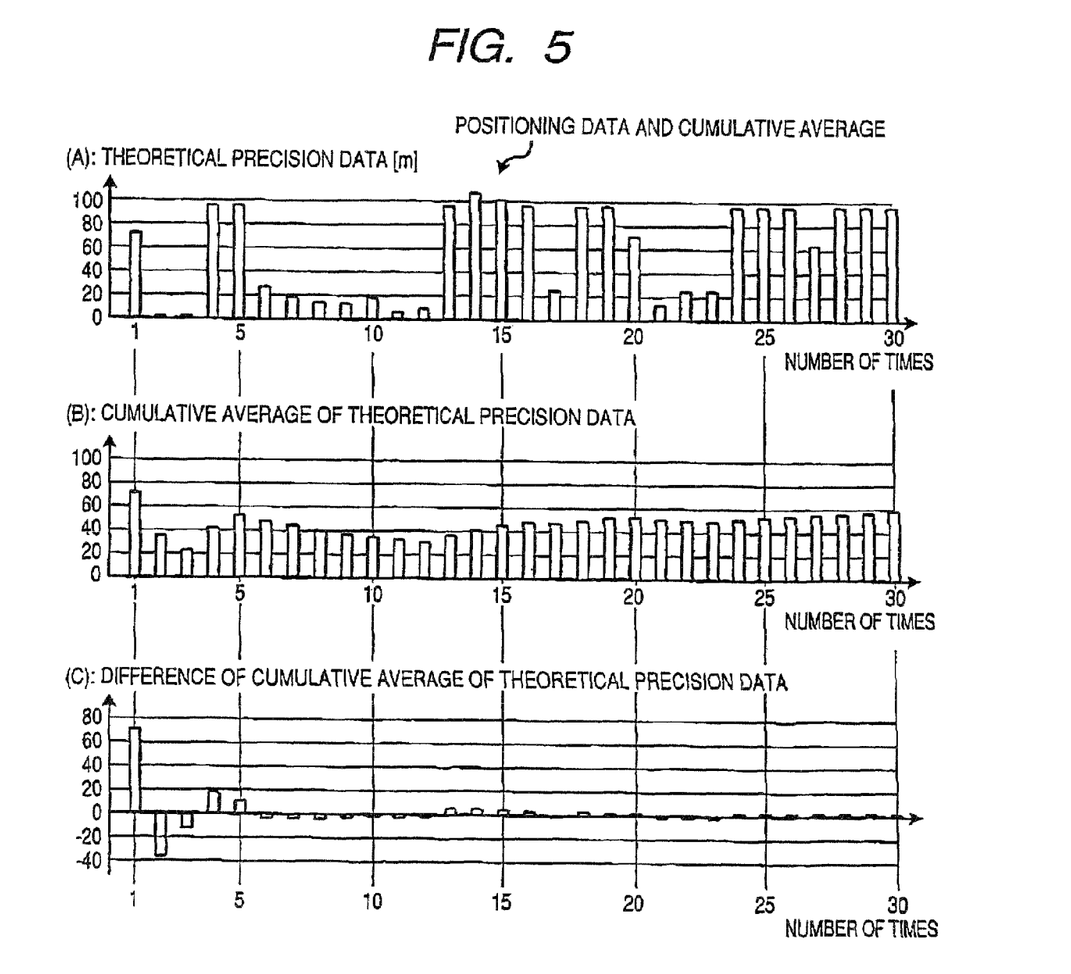
FIG. 5 is a graph showing the cumulative averages for the theoretical precision data as time series in the experiment of the location measurement for the portable terminal according to the embodiment.

FIG. 5 is a graph showing the cumulative averages for the theoretical precision data as time series in the experiment of the location measurement for the portable terminal according to the embodiment of the invention.

FIG. 5(A) shows the theoretical precision data in every measurement and is the same as FIG. 2(A).

FIG. 5(B) shows the cumulative average of the theoretical precision data obtained by dividing every cumulative value of the theoretical precision data by the cumulative number of times. As the cumulative number of times increases, variation decreases.

In FIG. 5(C), the variation in the cumulative average of the theoretical precision data is evaluated as a difference. The difference becomes small after sixth time, and this state continues.

On the other hand, as described in FIG. 4(C), the error of the cumulative average of the positioning data approximate to the real value after tenth time. Accordingly, when the state where the difference of the cumulative average of the theoretical precision data is small continues a predetermined number of times, it can be considered that the cumulative average of the positioning data approximates to the real value.

Next, an operation of the control unit will be described.

Figure 6:
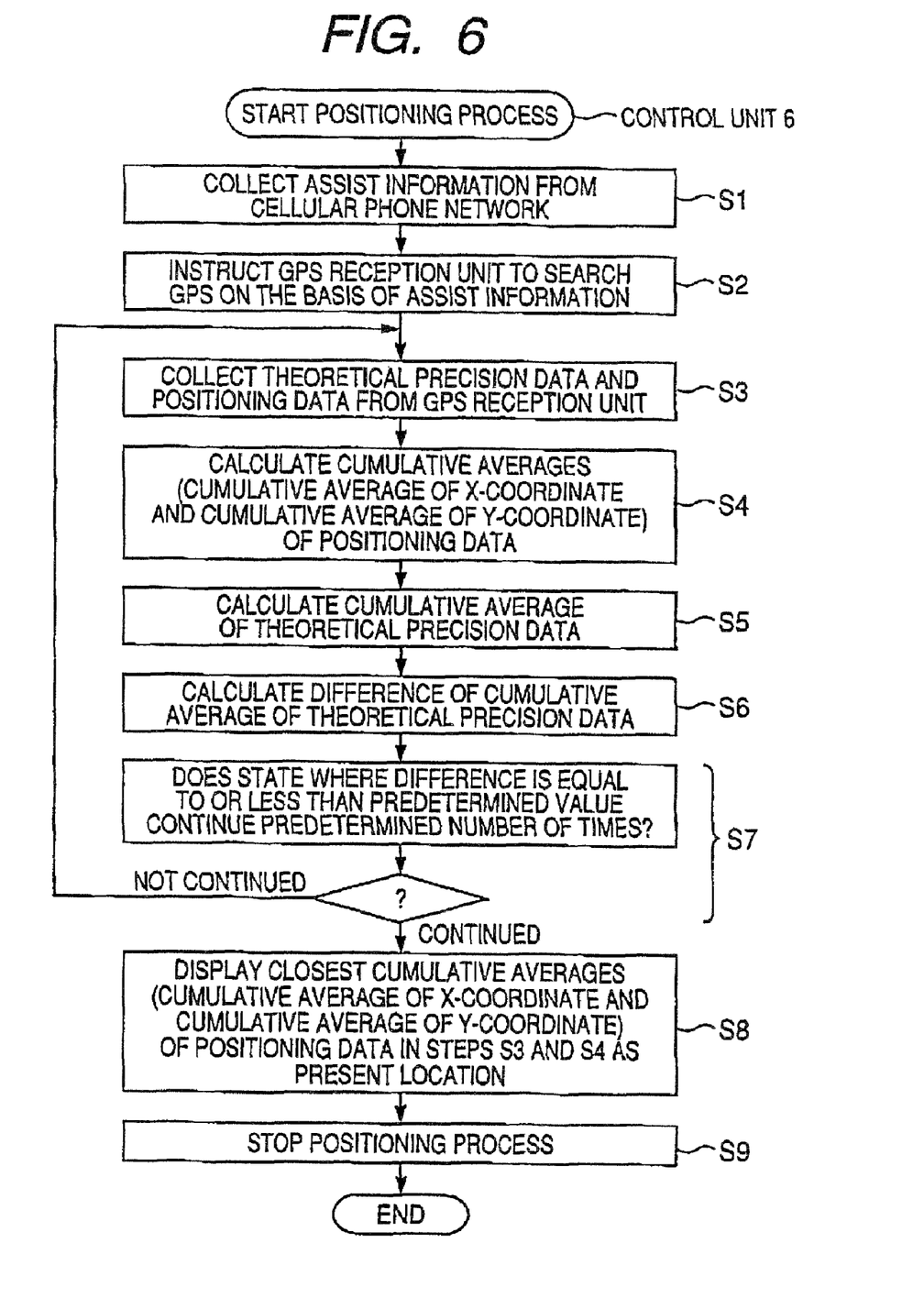
FIG. 6 is an exemplary flowchart illustrating an operation of the control unit of the portable terminal according to the embodiment.

FIG. 6 is a flowchart illustrating the operation of the control unit of the portable terminal according to the embodiment of the invention. The control unit 6 collects the assist information from the cellular phone network (Step S1). On the basis of the assist information, the control unit 6 instructs the GPS reception unit 3 to search the GPS satellites (Step S2). In addition, the theoretical precision data and the positioning data are collected from the GPS reception unit 3 at the first time (Step S3).

Subsequently, the cumulative average of the X-coordinate and the cumulative average of the Y-coordinate, which are the cumulative average of the positioning data (the X-coordinate and the Y-coordinate) are calculated (Step S4). The cumulative average of the X-coordinate and the cumulative average of the Y-coordinate become an X-coordinate and a Y-coordinate measured at the first time.

Next, the cumulative average of the theoretical precision data is calculated (Step S5). The cumulative average becomes the theoretical precision data measured at the first time. Subsequently, a difference between the cumulative average of the theoretical precision data and the previous cumulative average of the theoretical precision data is calculated (Step S6). The difference therebetween becomes a first cumulative average of the theoretical precision data at the first time.

Subsequently, it is checked whether a state where the difference is equal to or less than a predetermined value successively continues a predetermined number of times (Step S7). When the state does not continue, the process is returned to Step S3 to collect the second theoretical precision data and the positioning data from the GPS reception 3 unit.

Then, the same steps proceed. In Step S7, when the state where the difference is equal to or less than the predetermined value successively continues, it is considered that the cumulative average of the X-coordinate and the cumulative average of the Y-coordinate, which are the cumulative average of the positioning data, are approximate to the real value. The cumulative averages (the cumulative average of the X-coordinate and the cumulative average of the Y-coordinate) of the closest positioning data in Steps S3 and S4 are plotted as a present location on the display unit 5 (Step S8). Then, the poisoning process is stopped (Step S9).

In Steps S7 and S8, when the cumulative average of the X-coordinate and the cumulative average of the Y-coordinate approximate to the real value, they are plotted as the present location on the display unit automatically. However, when the difference of the cumulative average of the theoretical precision data calculated in Step S6 is displayed as a indicator of precision convergence on the display unit 5, a user may determine to plot the cumulative averages (the cumulative average of the X-coordinate and the cumulative average of the Y-coordinate) of the positioning data at the time of receiving an operational instruction from the key input unit 4 as the present location on the display unit 5.

According to the embodiment of the invention, the cumulative averages of the positioning data are calculated while performing the positioning process the plural number of times, the cumulative average and the theoretical precision data and the difference are calculated to determine that the cumulative averages of the positioning data approximate to the real value on the basis of the difference of the cumulative average of the theoretical precision data. With such a way, it is possible to obtain the positioning data close to the real value without performing the positioning process more than need be and waiting a user.

Examples of the portable terminal include a PHS, a PDA, and a GPS apparatus.

As described with the reference to the embodiment, there is provided a cellular phone capable of improving precision of positioning data in measuring a location.

According to the embodiment, positioning data close to a true value can be obtained without performing a positioning process the number of time than need be and without waiting a user.

What is claimed is:

1. A portable terminal comprising:
a display unit that displays a present location of the portable terminal;
a GPS receiver that calculates theoretical precision data and positioning data for indicating the present location of the portable terminal, based on a radio wave; and
a control unit that performs a plurality of times:
(i) a positioning process of the GPS receiver to obtain the theoretical precision data and the positioning data,
(ii) calculating a cumulative average of the positioning data, and
(iii) calculating a difference between a cumulative average of the theoretical precision data and a previous cumulative average of the theoretical precision data,
wherein the control unit controls the display unit to display the cumulative average of the positioning data as the present location, when the calculated difference is equal to or less than a predetermined value for a predetermined number of times.

2. The portable terminal according to claim 1, wherein the GPS receiver performs the positioning process using assist information from a server.

3. The portable terminal according to claim 1, wherein the theoretical precision data is determined theoretically based on a geometric arrangement of plural GPS satellites, based on location information of the GPS satellites contained in the radio wave, which is emitted from the GPS satellites.

4. The portable terminal according to claim 3, wherein the GPS receiver performs the positioning process using assist information from a server.

5. A portable terminal comprising:
a display unit that displays a present location of the portable terminal and location measurement precision; an input unit; a GPS receiver that calculates theoretical precision data and positioning data for indicating the present location of the portable terminal, based on a radio wave; and
a control unit that performs a plurality of times:
(i) a positioning process of the GPS receiver to obtain the theoretical precision data and the positioning data,
(ii) calculating a cumulative average of the positioning data, and
(iii) calculating a difference between a cumulative average of the theoretical precision data and a previous cumulative average of the theoretical precision data,
wherein the control unit controls the display unit to display the calculated difference as the location measurement precision, and
wherein the control unit controls the display unit to display the cumulative average of the positioning data as the present location, when the calculated difference is equal to or less than a predetermined value for a predetermined number of times.

6. The portable terminal according to claim 5, wherein the GPS receiver performs the positioning process using assist information from a server.

7. The portable terminal according to claim 5, wherein the theoretical precision data is determined theoretically based on a geometric arrangement of plural GPS satellites, based on location information of the GPS satellites contained in the radio wave, which is emitted from the GPS satellites.

8. The portable terminal according to claim 7, wherein the GPS receiver performs the positioning process using assist information from a server.

* * * * *